Figures 1, 15:
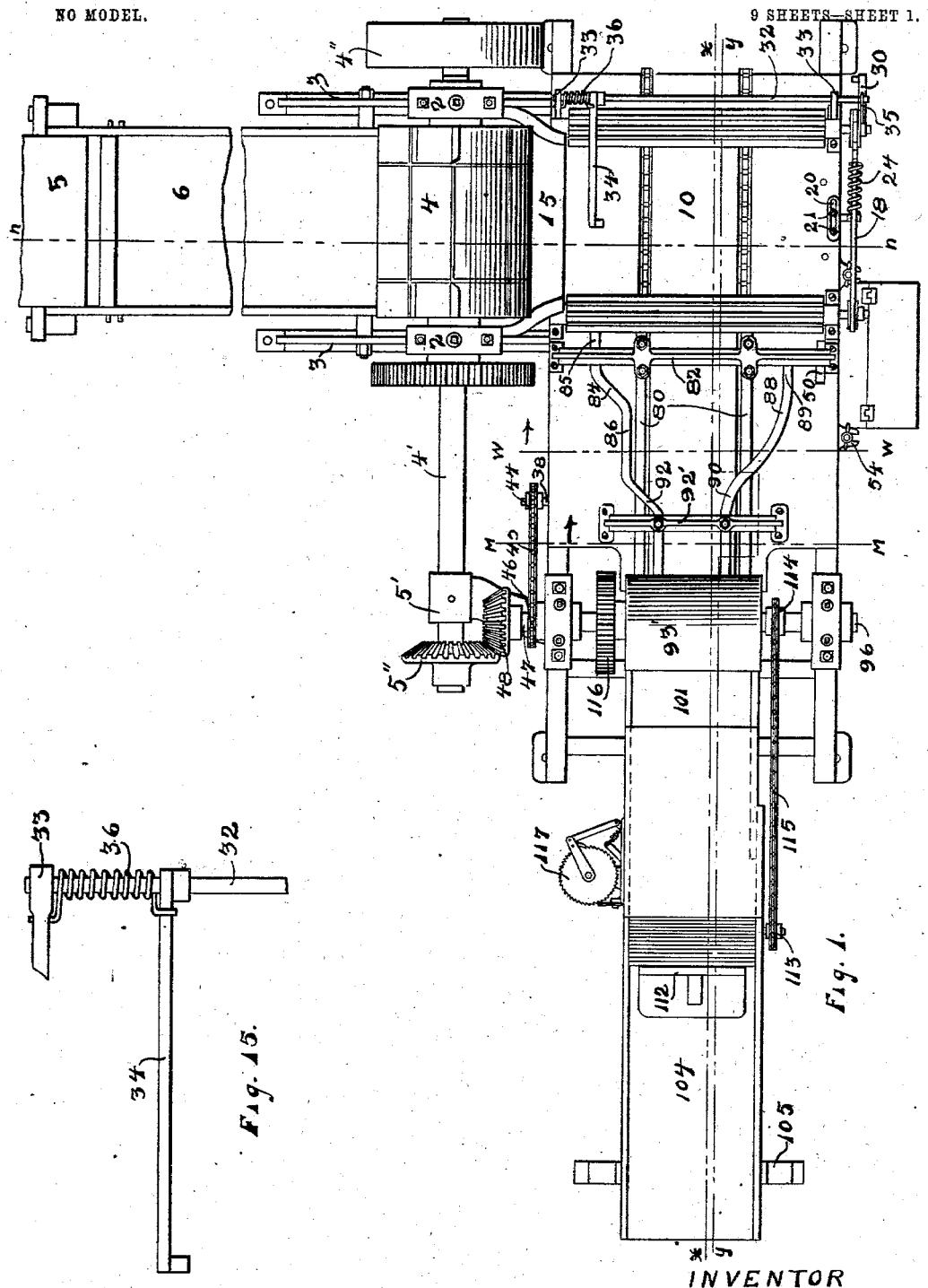

No. 730,410. PATENTED JUNE 9, 1903.
E. G. STAUDE.
PASTING AND FOLDING MACHINE FOR BOX BLANKS.
APPLICATION FILED OCT. 26, 1901.
NO MODEL. 9 SHEETS—SHEET 1.

WITNESSES
P. R. Thompson.

INVENTOR
EDWIN G. STAUDE.
BY Paul & Hawley
ATTORNEYS

No. 730,410. PATENTED JUNE 9, 1903.
E. G. STAUDE.
PASTING AND FOLDING MACHINE FOR BOX BLANKS.
APPLICATION FILED OCT. 26, 1901.
NO MODEL. 9 SHEETS—SHEET 2.

WITNESSES
P. R. Thompson
Richard Paul

INVENTOR
EDWIN G. STAUDE
BY Paul & Hawley
ATTORNEYS

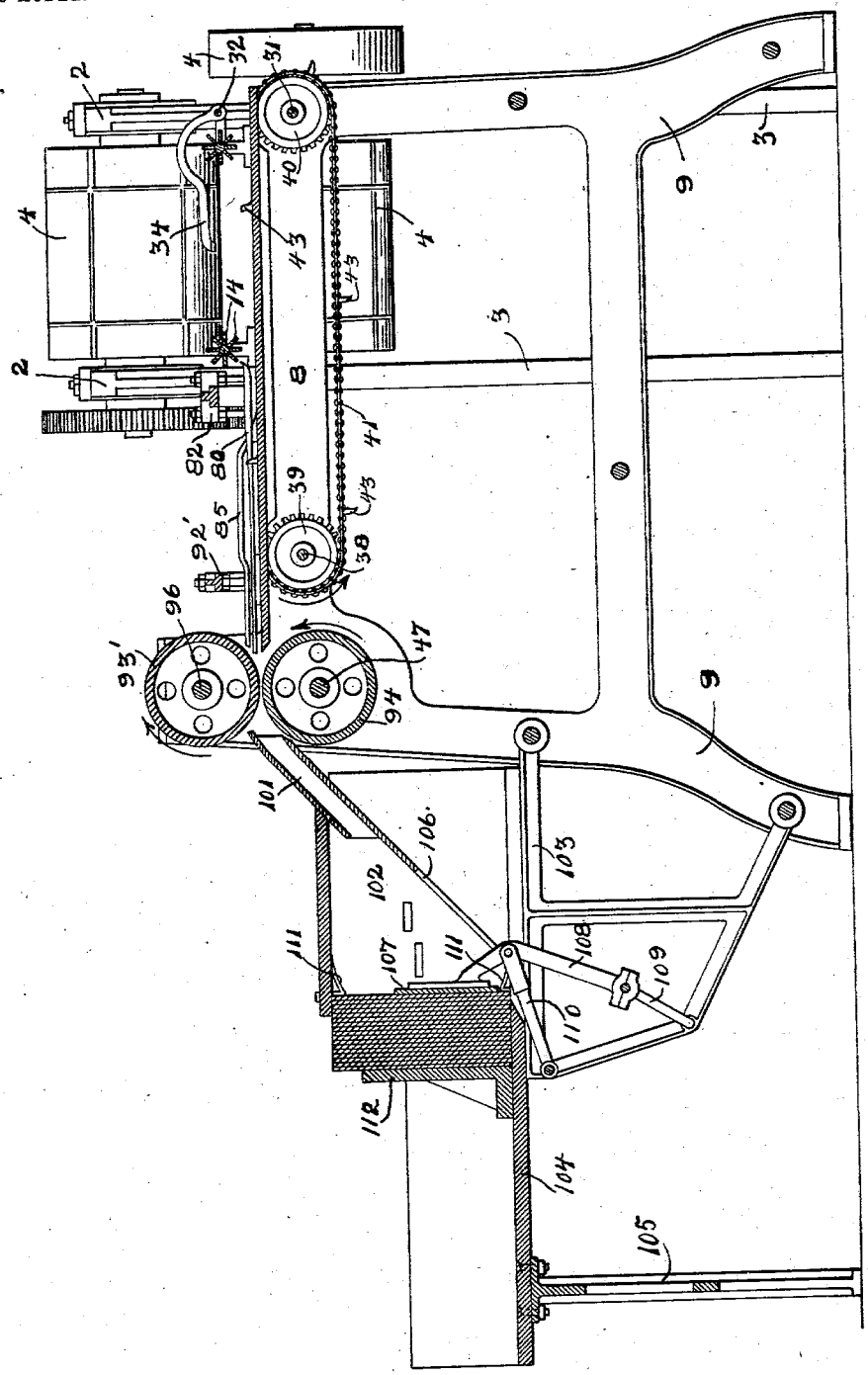

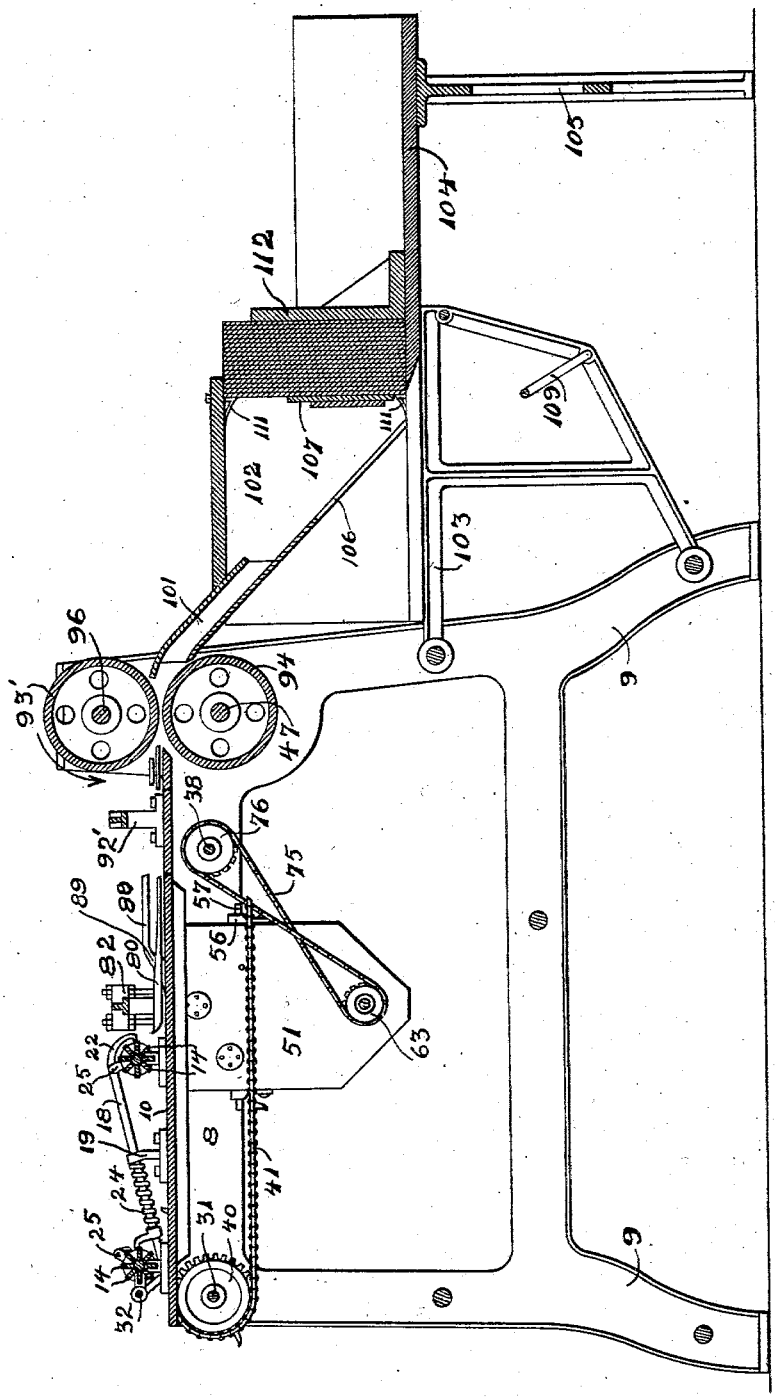

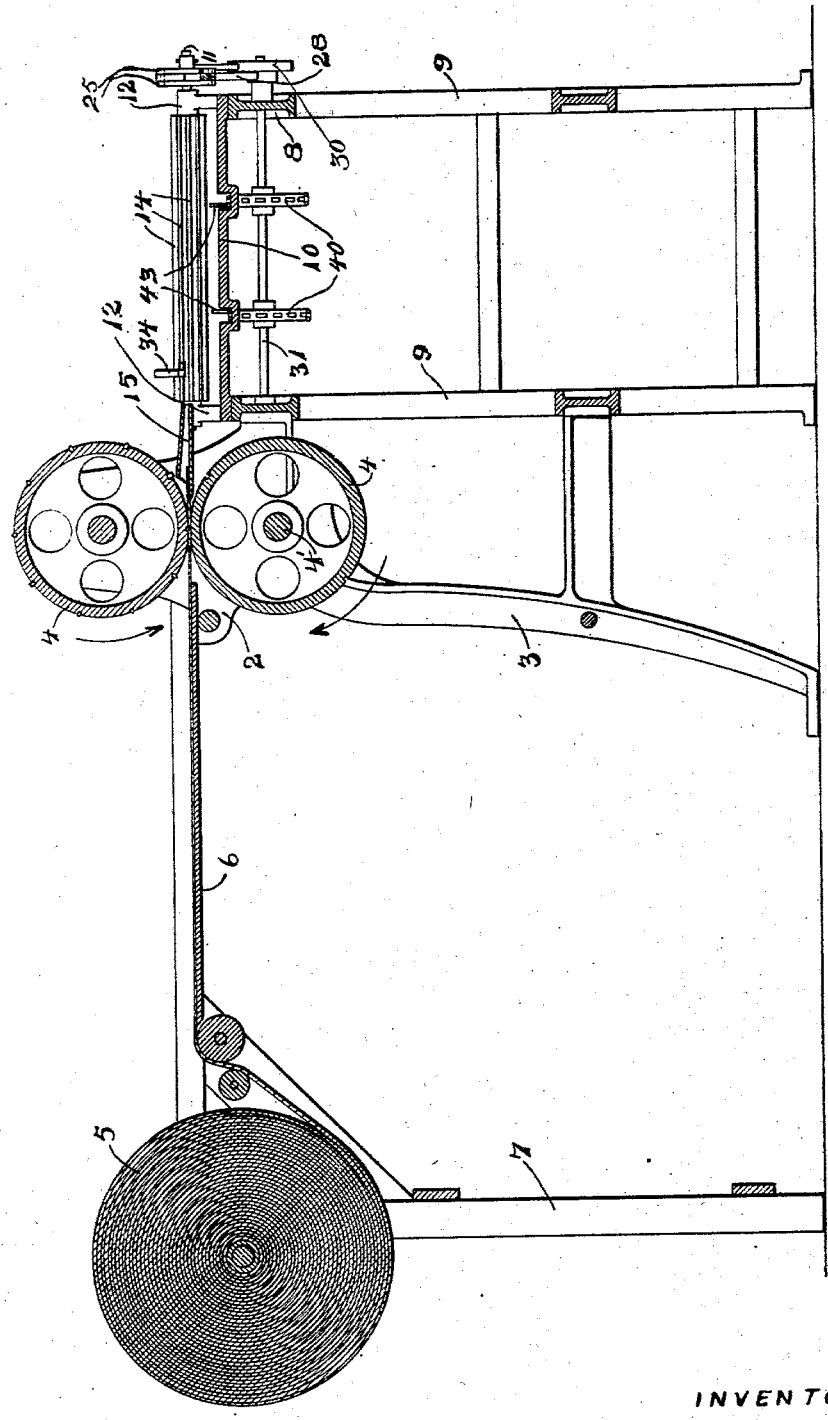

No. 730,410. PATENTED JUNE 9, 1903.
E. G. STAUDE.
PASTING AND FOLDING MACHINE FOR BOX BLANKS.
APPLICATION FILED OCT. 26, 1901.
NO MODEL. 9 SHEETS—SHEET 6.
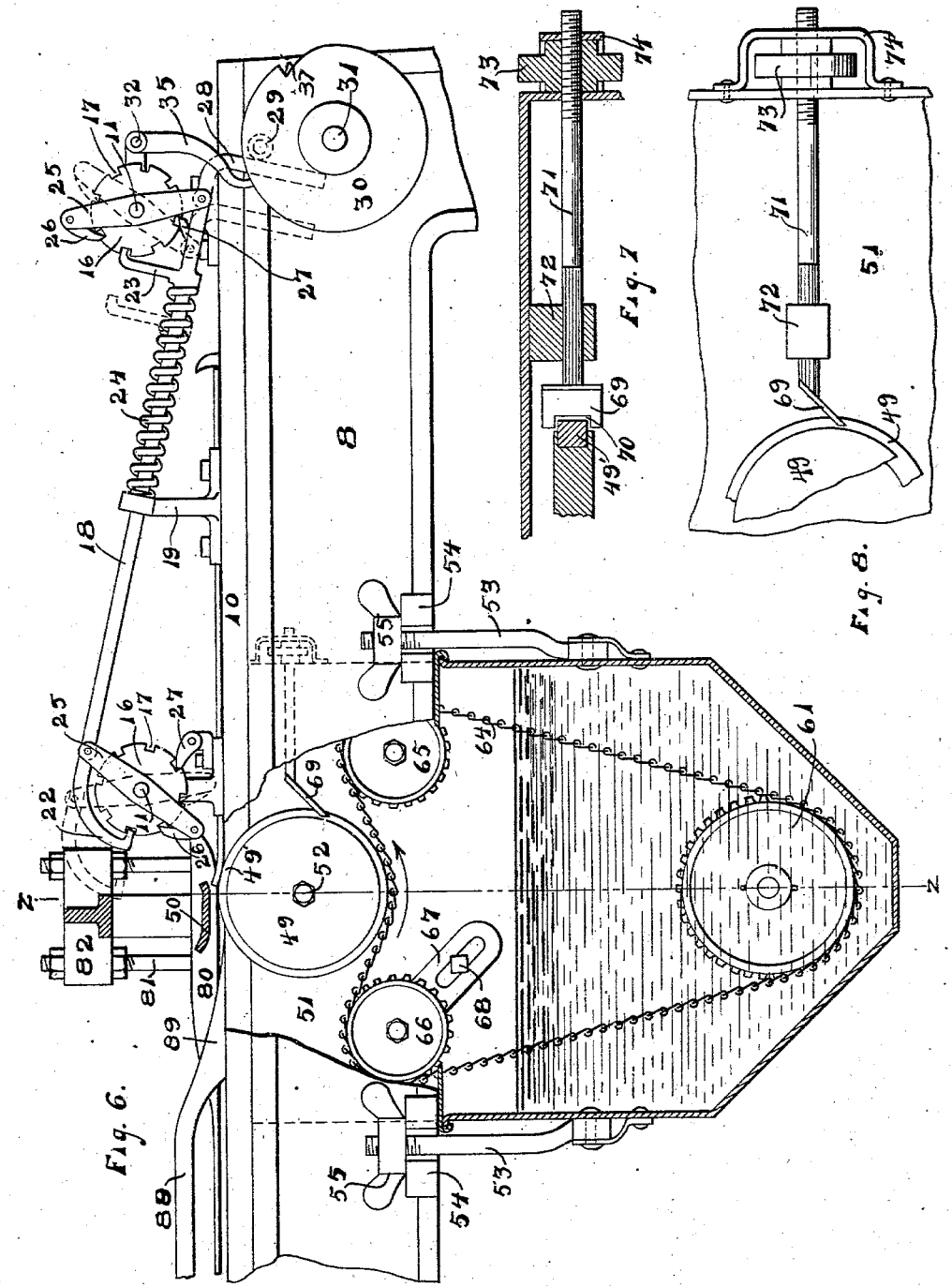
WITNESSES
P. R. Thompson
Richard Paul
INVENTOR
EDWIN G. STAUDE
BY Paul & Hawley
ATTORNEYS

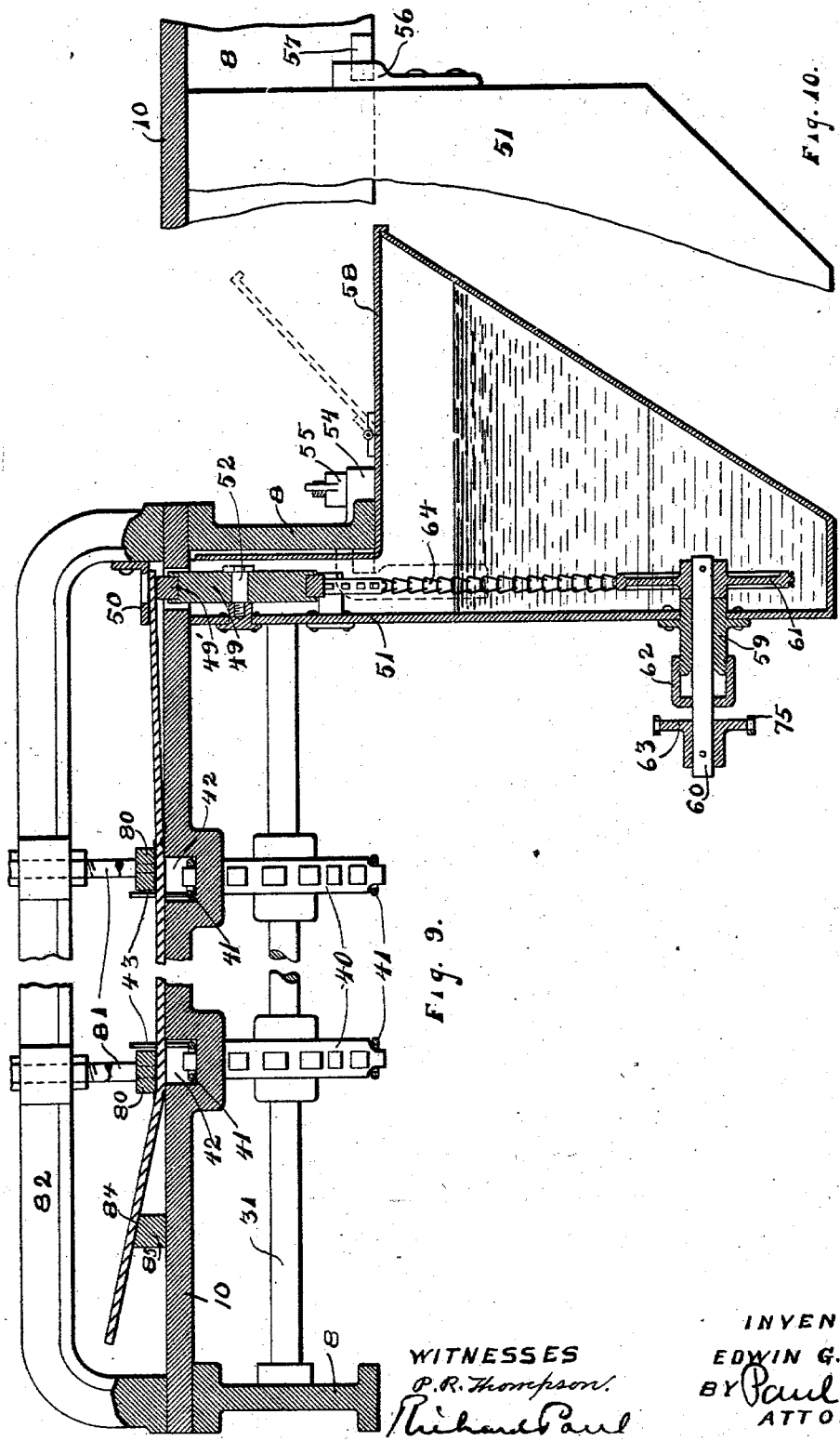

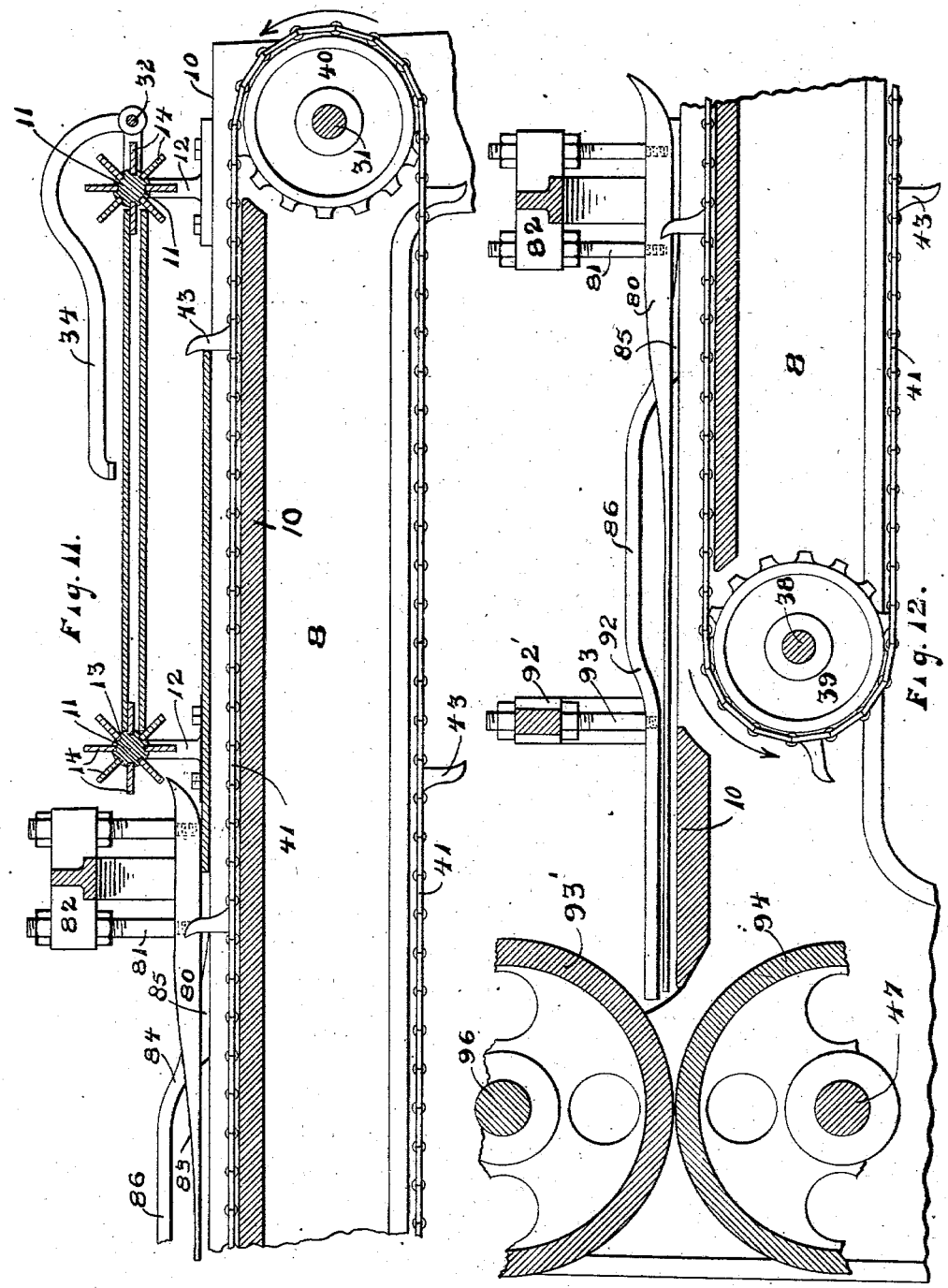

No. 730,410. PATENTED JUNE 9, 1903.
E. G. STAUDE.
PASTING AND FOLDING MACHINE FOR BOX BLANKS.
APPLICATION FILED OCT. 26, 1901.
NO MODEL. 9 SHEETS—SHEET 9.

WITNESSES
P. R. Thompson
Richard Paul

INVENTOR
EDWIN G. STAUDE
BY Paul & Hawley
ATTORNEYS

No. 730,410.                                        Patented June 9, 1903.

UNITED STATES PATENT OFFICE.

EDWIN G. STAUDE, OF MINNEAPOLIS, MINNESOTA.

PASTING AND FOLDING MACHINE FOR BOX-BLANKS.

SPECIFICATION forming part of Letters Patent No. 730,410, dated June 9, 1903.

Application filed October 26, 1901. Serial No. 80,041. (No model.)

*To all whom it may concern:*

Be it known that I, EDWIN G. STAUDE, of Minneapolis, county of Hennepin, State of Minnesota, have invented certain new and useful Improvements in Pasting and Folding Machines for Box-Blanks, of which the following is a specification.

The invention relates to machines for making boxes wherein cereal food is packed.

The object of the invention is to provide a machine for automatically receiving the creased and cut blank, pasting and folding the same, and delivering the completed box ready to be filled.

A further object is to provide a machine having a very large capacity, by the use of which a large saving can be effected in the expense of manufacturing the boxes as compared with their cost when made in the usual way.

A further object is to provide a machine that will turn out a finished box that will present a very neat appearance when filled with cereal food or other commodity that is packed therein.

Other objects of the invention will appear from the following detailed description.

The invention consists generally in providing a machine for automatically receiving a box-blank and pasting and folding the same all by one continuous operation.

Further, the invention consists in providing an automatic receiving mechanism for the box-blanks.

Further, the invention consists in improved means for operating said receiving mechanism.

Further, the invention consists in providing an improved pasting apparatus.

Further, the invention consists in providing improved means for feeding the paste.

Further, the invention consists in improved means for folding the blanks.

Further, the invention consists in various constructions and combinations, all as hereinafter described, and particularly pointed out in the claims.

Figure 2:
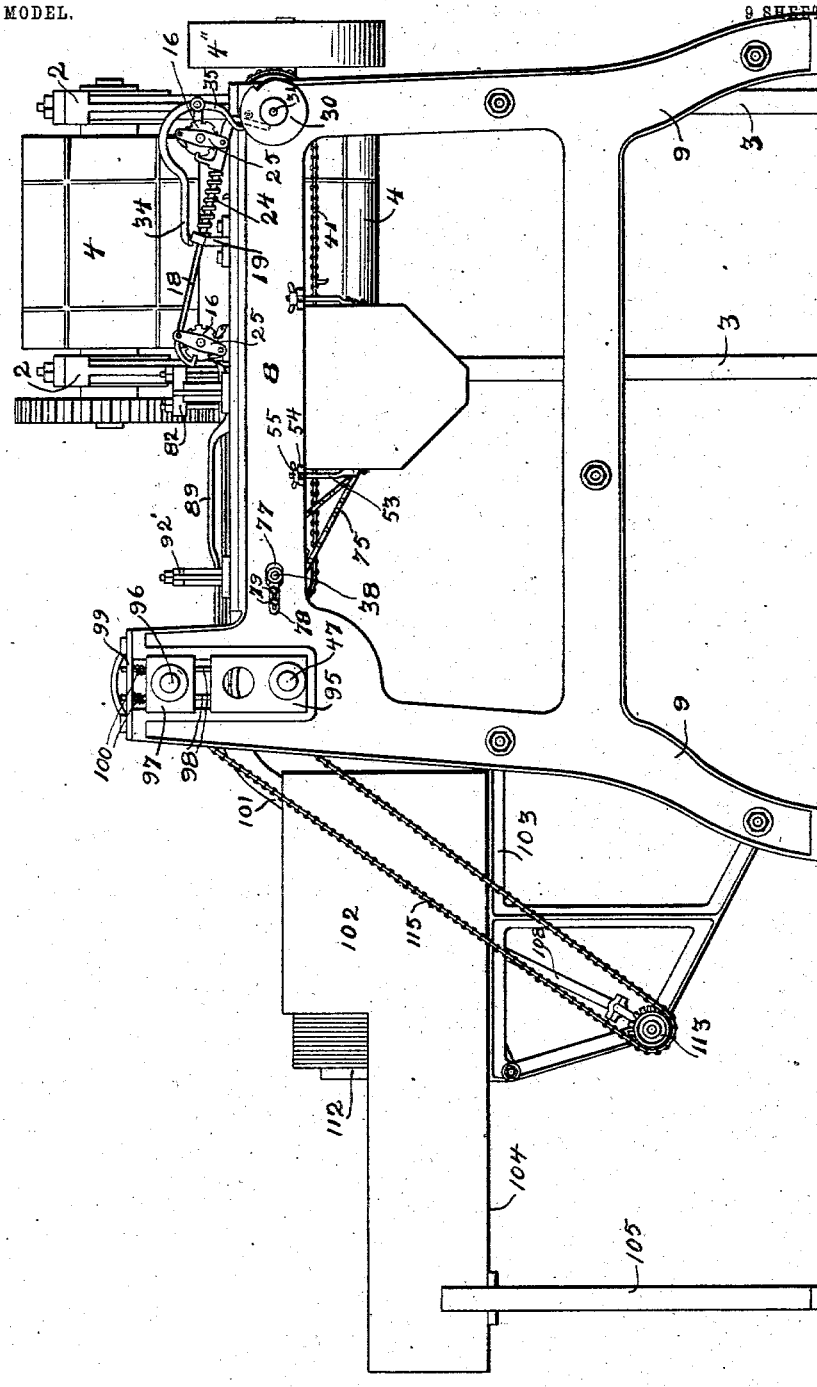
Figure 13:
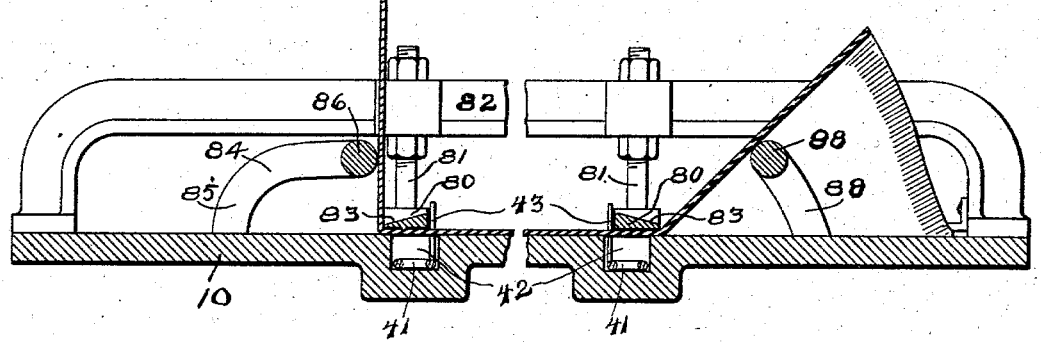
Figure 14:
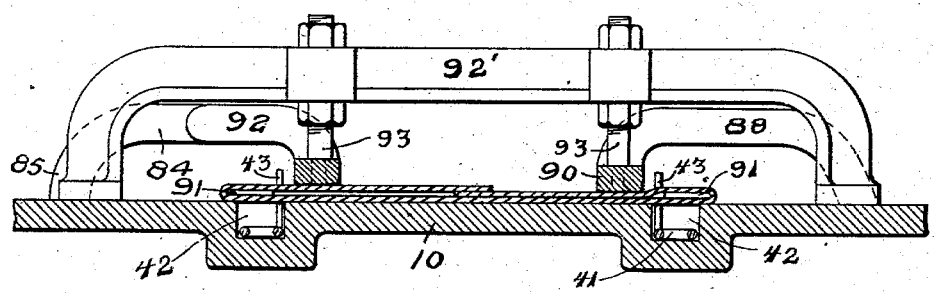

In the accompanying drawings, forming part of this specification, Figure 1 is a plan view of a machine embodying my invention. Fig. 2 is a side elevation of the same. Fig. 3 is a longitudinally vertical section on the line $x$ $x$ of Fig. 1 looking toward the left of the figure. Fig. 4 is a similar view on the line $y$ $y$ of Fig. 1 looking toward the right of the figure. Fig. 5 is a transverse section on the line $n$ $n$ of Fig. 1 looking toward the top of the sheet. Fig. 6 is a detail of the mechanism for operating the receiving devices and of the pasting means. Figs. 7 and 8 are details of the adjustable paster-roll-cleaning device. Fig. 9 is a section on the line $z$ $z$ of Fig. 6. Fig. 10 is a detail showing the manner of supporting the paste-reservoir on the machine-frame. Fig. 11 is a detail of the box-blank-receiving rolls and of the feed devices. Fig. 12 is a detail of the folding devices and pressure-rolls. Fig. 13 is a sectional view on the line $w$ $w$ of Fig. 1 looking in the direction of the arrow. Fig. 14 is a similar view on the line $m$ $m$ of Fig. 1 looking in the same direction as in the previous figure. Fig. 15 is a detail of the knocker-arm and its support.

In the drawings, 2 represents a frame, 3 the supporting-legs, and 4 cutting-rolls mounted in bearings in said frame, between which the paper or strawboard stock is fed from a roll 5 over a table 6, said roll and table being supported by the frame 2 and legs 7. The rolls 4 are provided with knives and creasers, which cut out the blanks for the boxes, scoring or creasing them where the folds are to be made at the corners of the box, and as the blanks pass from between the rolls they are delivered to the receiving mechanism of the pasting and folding machine, as hereinafter described. These cutting devices form the subject-matter of the application of William B. Browning, filed April 27, 1901, Serial No. 57,658, and need not, therefore, be described in detail in this application. The shaft 4' of the lower cutting-roll extends out beyond the frame on each side and is provided on one end with a driven pulley 4", while its other end projects a suitable distance beyond the frame and is supported in a bearing 5' and provided with a bevel-gear 5".

8 represents the frame of the pasting and folding machine, supported on suitable legs 9 and having a flat top or table 10.

The pasting and folding machine is arranged on the delivery side of the cutting-rolls longitudinally with respect thereto, and the frame of said machine and the supports for said rolls may be united or arranged independently of each other, as preferred. Near the delivery side of the cutting-rolls I provide two star-rolls, each consisting of a shaft 11, supported in bearings 12 transversely on the table 10, said shafts being provided with a series of shallow longitudinal grooves 13 to receive a corresponding number of flat plates or wings 14, that are secured within said grooves by solder or other suitable means. The star-rolls are opposite the ends of the cutting-rolls and revolve in a direction substantially at right angles to the direction of rotation of said cutting-rolls. As the blanks pass from between the cutting-rolls the one in front will be pushed forward by those succeeding into engagement with the star-rolls, its edges resting upon the opposite corresponding wings of said rolls, being guided thereto by the plate 15.

In Fig. 11 I have shown a blank lying upon the table and being advanced toward the folding devices, a second blank on the point of being delivered upon the table by the star-rolls, and a third blank that has just been delivered to said rolls from the cutting devices. The star-rolls have a step-by-step movement, and any suitable mechanism may be provided for operating them. I prefer, however, to employ the means shown clearly in Fig. 6 of the drawings, wherein 16 represents disks secured on the shafts 11 and provided in their peripheries with a series of notches 17. A longitudinally-movable rod 18 is supported in a standard 19 on the top 10 and adjustable in a slot 20 therein by means of bolts 21. This rod is provided with a hook 22 at one end to engage the notches of one of the disks 16, while an arm 23 near the opposite end of said rod engages the notches of the other disk. A spring 24 normally holds said hook and arm in engagement with said disk. Mounted upon the shafts 11 are arms 25, pivotally connected to the rod 18 near its ends, each arm carrying a dog 26, adapted to engage, respectively, the notches of said disks. Near each disk on the table 10 I provide pawls 27, also engaging, respectively, the notches of said disks. The rod is also provided with a downwardly-turned end 28 in position to be struck by a roller 29, mounted in the side of the disk 30, that is secured upon the shaft 31. The revolution of said disk will cause the rod 18 to be moved longitudinally against the tension of the spring to the position indicated by dotted lines in Fig. 6. When the rod is moved, the hook 22 and arm 23 will be disengaged from the disks and the dogs 26 will be advanced one notch thereon, and on the return movement of said rod the disks and the star-rolls will be revolved toward each other one step. The pawls 27 will slide over the disks as they are operated toward each other, but will prevent any backward or reverse movement thereof. When the rod 18 returns to its normal position, the hook and arm thereon will engage notches in the disks and prevent accidental movement of the star-rolls. The tension of the spring 24 may be regulated by the adjustment of the arm 19.

32 is a rock-shaft mounted in brackets 33, carrying a knocker-arm 34 and the arm 35, whose free end is held in engagement with the periphery of the disk 30 by a spring 36. A notch 37 is provided in the periphery of said disk, into which the arm 35 drops with every revolution of the disk. When the arm drops off into the notch, the shaft will be rocked by the spring 36 and the knocker-arm will strike a short quick blow on the blank and prevent it from buckling up during its passage through the star-rolls. The notch 37 is preferably near and in the rear of the roller 29, and as the rod 18 is operated to rotate the star-rolls one step and discharge the blank the stroke of the knocker-arm will immediately follow the movement of said rod and act upon the incoming blank and cause it to assume a level position in the rolls. Opposite the shaft 31, occupying a corresponding position beneath the top 10 and mounted in bearings in the machine-frame, is a shaft 38, and upon these shafts 31 and 38 I provide sprockets 39 and 40, connected by belts 41, operating in depressions or grooves 42 in the top 10 and provided at intervals with a series of lugs 43, which project above said top during a portion of their travel. The shaft 38 is provided with a sprocket 44, connected by a belt 45 with a sprocket 46 on a shaft 47, that is driven from a gear 5" through a similar gear 48 on said shaft. When the blank is discharged by the star-rolls, it falls upon the top 10 in position to be engaged by the lugs 43 and is moved thereby over the table or top into engagement with the periphery of a paster-wheel 49, being directed thereon by a guide 50. This paster-wheel is pivoted on the wall of a paste-reservoir 51 by means of a screw 52. A ring of yielding material, such as rubber 49', is provided, preferably, within a groove in the periphery of the paster-wheel. The reservoir is preferably constructed of sheet metal, having a hopper-bottom and provided with supporting-rods 53, that are pivotally connected to the walls of the reservoir and have threaded upper ends hung in slotted lugs 54 on the frame by means of thumb-nuts 55. (See Fig. 6.) Upon loosening these nuts the rods may be swung out of their supporting-lugs when it is desired to disengage the reservoir from the machine. I also prefer to provide hooks 56, Fig. 10, on the reservoir to engage a rib 57 on the frame to prevent the reservoir from swinging outward when the thumb-nuts are tightened. The reservoir is provided with a cover 58, and whenever desired the paste-receptacle may be removed from the machine and thoroughly cleaned and refilled. The rear wall of the reservoir near the bottom thereof is provided with a bearing 59 for a short shaft 60, that projects into the reservoir and whereon the sprocket 61 is secured. A stuffing-box 62 is preferably provided over the threaded outer end of the bearing 59 to prevent the escape of paste from the reservoir. A sprocket 63 is secured on the outer end of the shaft 60. The sprocket 61 is connected by a chain 64 with idler-sprockets 65 and 66, supported on the wall of the reservoir, the sprocket 66 being carried by a slotted plate 67, that is adjustable on a bolt 68 and by means of which the tension of the chain may be regulated. The sprockets 65 and 66 are arranged on each side of the wheel 49, and their upper edges are a little above the lower edge of the said wheel, so that the chain 64 will engage the ring 49' and cause the wheel to revolve and at the same time will deposit a quantity of the paste material on said ring. I prefer to employ a chain having flat links, which in passing through the paste will gather up a considerable quantity and carry it up to the paster-wheel. To prevent too great an accumulation of paste on the ring and to clean off any that may dry thereon, I prefer to provide a scraper device consisting of a plate 69, having a slot 70 to receive the ring 49' and mounted on a rod 71, that is longitudinally movable in a guide 72 and in the wall of the reservoir. The rod 71 near the scraper is preferably square in cross-section to fit the corresponding hole in said guide. The squared portion of the rod will prevent it and the scraper from turning and will insure the scraper being held evenly against the periphery of the ring. The outer end of the rod is threaded and carries a thumb-wheel 73, inclosed by a suitable cap 74. Rotation of the wheel 73 will move the rod 71 longitudinally and advance the scraper into engagement with the ring 49' or withdraw it therefrom. The operator can thus control the supply of paste on the paster-wheel and keep the periphery of the ring smooth and clear of all dried paste. The paste-feeding apparatus is driven by a belt 75, connecting the sprockets 63 with a sprocket 76 on the shaft 38. This shaft is horizontally adjustable in slots 77 in the machine-frame by means of slotted plates 78 and bolts 79. The adjustability of this shaft permits proper tension of the belt 75 and also of the carrier-belts 41. In Fig. 6 I have shown a box-blank in contact on one side with the periphery of the paster-wheel.
This wheel, as shown, projects slightly above the plane of the machine-top, and when the blank comes in contact with the periphery of said wheel its edge will bear thereon with sufficient pressure, being held down by the guide 50, to accumulate a considerable quantity of paste. During the passage of the blank over the paster-wheel one edge will be coated with paste to secure the edges together when the blank is folded. I prefer to provide gages 80, under which the blanks travel, that are supported upon rods 81, vertically adjustable in a transverse yoke 82.

These gages are raised or lowered to regulate their distance from the machine-top according to the thickness of paper-stock employed in making the boxes. The lugs of the carrier-belts travel along beside these gages and push the blanks beneath them. As shown in Fig. 13, the gages for a portion of their length are provided with beveled or inclined upper faces or surfaces 83, presenting comparatively thin outer edges over which the walls of the box are folded. While one edge of the blank is being coated with paste its opposite edge engages the inclined surface 84 of a folder 85, provided on the machine-top near the traveling belts. (See Figs. 11 and 13.) This folder turns the side of the blank as it is carried along by the belts and is provided with an intermediate portion 86, that approaches close to and runs parallel with the gage on that side of the machine. The part 84 of the folder raises the blank on one side to a substantially vertical position, as shown in Fig. 13, and when so raised the blank travels along with one side held up by the intermediate portion 86. About the time the blank leaves the part 84 of the folder on one side it engages an inwardly-curved portion 88 of a folder 89, provided on the opposite side of the machine-top near the paster-wheel. As soon as the forward edge of the blank leaves the wheel it is engaged by this folder, and while the opposite side of the blank is traveling along by the part 86 the edge that is coated with paste is being raised to a vertical position by the part 88, as indicated in Fig. 13. The part 88 approaches the gage on that side of the machine, and a curved portion 90 of the folder crosses the gage and extends parallel therewith toward the pressure-rolls. As the paste-coated side of the blank leaves the part 88 it is engaged by the curved portion 90 and folded down over the flattened end 91 of the gage to the position indicated in Fig. 14. When the part 90 begins to fold down the pasted edge of the blank, the part 92 of the opposite folder almost simultaneously begins to fold down the blank on that side over the pasted edge. This part 92 crosses the gage and from thence runs parallel therewith and with the folder on the opposite side toward the pressure-rolls. Upon leaving the part 92 the side of the blank will be folded over the end of the gage upon the paste-coated opposite edge of the blank. (See Fig. 14.) The outer ends of the folders are supported on rods 93, that are vertically adjustable in the yoke 92'. By means of these adjustable rods the distance between the folders and the machine-top may be varied according to the thickness of the blanks and the pressure it is desired to exert upon them. While the edge on one side of the blank is being coated with paste the opposite side will be raised to a vertical position, and then the edge having been pasted it in turn will be raised and folded down to a horizontal position in advance of the other side, so that when completely folded the paste-coated edge will be beneath and overlapped by the opposite edge. As the folded blank passes out at the discharge end of the folders it is engaged by the coacting pressure-rolls 93' and 94, the latter being carried on the shaft 47, that is mounted in boxes 95 on the machine-frame. The upper roll 93' is carried on a shaft 96, that is mounted in boxes 97, that are arranged upon screws 98, whose lower ends rest upon the boxes 95 and whose upper ends project through and are slidable in holes provided in plates 99 on said frame. Springs 100 are provided between the boxes 97 and the plates 99 and normally hold the upper roll down upon the lower with a yielding pressure and permit it to adjust itself automatically to the thickness of the blanks that pass between the rolls. The pressure-rolls squeeze the overlapping edges of the blanks together and spread the paste thereon, causing them to adhere firmly together. After leaving the pressure-rolls the blanks, that are now in the form of flattened boxes with open ends, pass into an inclined chute 101, that directs them to a case 102, provided at the discharge end of the machine. This case or box is supported upon a frame 103 and has a table or floor 104 extending out for a considerable distance beyond the machine and supported on legs 105. An opening 106 is provided in the bottom of the chute 101, through which a packer-plate 107 operates. This packer-plate is carried by an arm 108, mounted on a crank-shaft 109, that is supported in the frame 103. A link 110 has a pivotal connection with the arm 108 and also with the frame 103. Preferably at a point near the table 104 I prefer to provide springs 111 in the top and bottom of the case 102, between which and a suitable backing-plate 112 the boxes, now in their flattened form, are pressed together in a vertical position by the reciprocating movement of the packer. Any suitable means may be provided for operating the packer-arm; but I prefer to provide a sprocket 113 on the crank-shaft 109, connecting the same with a sprocket 114 on the shaft 96 by a belt 115. A gear 116 on the shaft 96 meshes with a similar gear on the shaft 47 of the lower pressure-roll.

In Fig. 1 I have shown a counting device 117, by means of which the number of blanks delivered to the case may be registered. This device, however, I do not claim in this case, as the same forms the subject-matter of a companion application which I am about to file.

The cutting and creasing rolls are preferably adapted to turn out two completed blanks with each revolution, and I therefore provide a gear mechanism for operating the star-rolls that will rotate them two steps with each revolution of the cutting-rolls, so that as the blanks pass out from the cutting-rolls they will move directly upon the supporting-wings of the star-rolls. The carrier-belts beneath the star-rolls are operated by the required speed to present a pair of lugs beneath said rolls when a blank is on the point of being discharged therefrom. The star-rolls will serve to regulate or control the feed of the blanks, preventing clogging thereof and any delay in the operation of the machine. As soon as a blank has passed in toward the star-rolls, it will be struck by the knocker-arm and any tendency of bending or buckling thereof arrested. As soon as the blanks are caught by the lugs of the carrier-belts they will be advanced toward the pasting device, where one edge of each blank will be coated with paste. At this point the blanks will be engaged by the folder, their sides folded over, so that the pasted and non-pasted edges will overlap, and then these edges will be firmly pressed together by the pressure-rolls. The operation is thus continuous and complete. A roll of paper or strawboard is fed in at one end of the machine, cut into blanks of suitable size, pasted, folded, and discharged at the other end of the machine a complete box ready to be filled.

Having thus described my invention, I claim as new and desire to secure by Letters Patent—

1. A machine for making flexible boxes, comprising means for cutting out and creasing the blanks, in combination, with means operating step by step for receiving the blanks and discharging them one at a time.

2. A machine for making flexible boxes, comprising means for cutting out and creasing the blanks, devices operating step by step for receiving the blanks from said cutting means and discharging them one at a time, means for advancing the blanks toward the pasting device, means for pasting the edges of the blanks, and means for folding them.

3. A machine for making flexible boxes, comprising means for cutting out and creasing the blanks, revolving devices operating step by step for receiving the blanks from said cutting means, means for intermittently operating said feed revolving devices to discharge the blanks one at a time, means for advancing the blanks toward the pasting device, means for pasting their edges, and means for folding them.

4. A machine for making flexible boxes, comprising means for cutting out and creasing the blanks, star-rolls for receiving them from said cutting and creasing means, means for intermittently operating said roll step by step, advancing means to receive the blanks from said rolls, means for applying paste to the edges of said blanks, means for folding said blanks, and means for pressing their edges together.

5. In a machine for making flexible boxes, the combination, with means for cutting out and creasing the blanks, of star-rolls adapted to receive the blanks from said cutting means, means for intermittently operating said star-rolls to discharge the blanks one at a time, and means for preventing the upward bending or buckling of the blanks while passing through said rolls, substantially as described.

6. In a machine for making flexible boxes, the combination, with means for cutting out and creasing the blanks, of star-rolls adapted to receive the blanks from said cutting means and discharge them one at a time, means for intermittently operating said rolls step by step, and an intermittently-operated knocker-arm provided near said rolls, for the purpose specified.

7. In a machine for making flexible boxes, the combination, with means for cutting out and creasing the blanks, of star-rolls provided opposite the discharge side of said cutting means and substantially at right angles thereto, said rolls being adapted to receive the blanks one at a time between their wings or flanges, and means for intermittently operating said rolls step by step to discharge the blanks one at a time, for the purpose specified.

8. The combination, with the star-rolls having disks provided with a series of notches, of a rod having hook portions adapted, respectively, to enter said notches, arms mounted on said roll-shafts and pivotally connected with said rod, dogs provided on said arms and engaging said notches respectively, means for limiting the backward movement of said rolls, a spring for normally holding said rod in engagement with the said disks, and means for actuating said rod against the tension of its spring to move said rolls toward each other one step at a time, for the purpose specified.

9. The combination, with the star-rolls having disks provided with a series of notches, of a rod having hooked portions, a spring normally holding them in engagement with said disks, whereby said rolls are normally locked, suitable means pivotally connected with said rod and engaging said disks, means preventing the backward movement of said rolls and disks, and means for actuating said rod to release said rolls and allow said pivoted engaging means to rotate them one step on the return of said rod.

10. In a machine of the class described, means for receiving and supporting the blanks by their opposite edges only and discharging them one at a time, means for preventing the blanks from buckling or bending during the receiving and discharging operation, means for applying paste to the edges of the blanks while in motion, means for folding the blanks, and means for pressing their edges together.

11. In a machine of the class described, means for supporting the blanks by their opposite edges only and discharging them one at a time, means for receiving the blanks from said supporting means and advancing the same toward the pasting device, means for applying paste to the edges of the blanks, means for folding the sides of the blanks together, and means for pressing or squeezing their overlapping edges.

12. In a machine of the class described, means for supporting the blanks by their opposite edges only and discharging them one at a time, means for preventing buckling or bending thereof during the discharging operation, means for receiving the blanks from said supporting means and advancing them toward the pasting apparatus, means for applying paste to the edges of the blanks on one side thereof, means for folding the sides of the blanks to cause their pasted and non-pasted edges to overlap, and means for pressing said edges together.

13. The combination, with means for advancing the blanks, of means for applying paste to the edges thereof, and a chain-belt device for elevating the paste and depositing it upon said applying means, substantially as described.

14. The combination, with means for advancing the blanks, of a rotating paster-wheel, a paste-reservoir, and a chain-belt device adapted to gather up the paste and deposit it upon the periphery of said wheel.

15. The combination, with a rotating paster-wheel, of a paste-reservoir, and a chain belt passing through the paste in said reservoir and adapted to gather up the same and deposit it upon the periphery of said wheel.

16. The combination, with a reservoir adapted to contain a supply of paste, of a rotating paster-wheel supported above and out of contact with the paste-supply, and a link-belt device adapted to travel through said paste and gather up the same and deposit it upon the periphery of said wheel, and means for regulating the tension of said belt device.

17. The combination, with a reservoir adapted to contain a supply of paste, of three sprockets mounted in said reservoir, one of them being submerged in the paste, a rotating paster-wheel provided between the other two sprockets, a chain belt passing over said sprockets and engaging the periphery of said paster-wheel, substantially as described.

18. The combination, with the machine-top, of vertically-adjustable gages provided thereon, a folder 85 having parts 84 and 92 running diagonally with respect to said gages and a part 86 substantially parallel therewith, and a second folder 89 having an inwardly-curved part 88 and a part 90 crossing the gage on that side and extending parallel therewith, substantially as described.

19. The combination, with the machine-frame having a rib 57, of a paste-reservoir having hooks 56 to engage said rib, and pivoted connections provided between the outer portion of said reservoir and said frame, substantially as described.

20. The combination, with the machine-frame having slotted lugs 54, of a paste-reservoir, rods 53 pivotally connected to said reservoir and adapted to enter the slots in said lugs, thumb-nuts provided on said rods, and means connecting the inner wall of said reservoir and said frame to prevent tilting of the former when said thumb-nuts are tightened.

21. In a machine for making flexible boxes, means for cutting out and creasing the blanks, in combination, with step-by-step devices adapted to receive the blanks, support them by their edges only, and discharge them one at a time, and means for intermittently operating said devices.

22. In a machine for making flexible boxes, means for cutting out and creasing the rolls, in combination, with revolving rolls adapted to receive the blanks from said cutting-out means and support them by their opposite edges only, carrier-belts whereto the blanks are delivered one at a time from said rolls, and means for intermittently operating said rolls.

23. In a machine for making flexible boxes, revolving step-by-step devices adapted to receive the blanks and support them by their opposite edges only, and an intermittently-operating knocker adapted to engage the middle portions of the blanks and prevent buckling and bending thereof while passing between said step-by-step devices.

24. In a machine of the class described, means for receiving and supporting the blanks by their opposite edges only and discharging them one at a time, and means for preventing the blanks from buckling or bending during the receiving or discharging operation.

25. The combination, with means for cutting and scoring the blanks of devices revolving toward each other step by step substantially at right angles to said cutting and scoring means for receiving said blanks and discharging them one at a time.

26. In a box-making machine, a pair of operating revolving devices operating toward each other step by step between which the blanks are delivered, and means for intermittently operating said devices.

27. In a box-making machine, means for severing the blanks, star-rolls operating toward each other adapted to receive the severed blanks, and means for intermittently operating said rolls.

28. In a machine for making flexible boxes, the combination, with means for advancing the blanks, of a paste-reservoir and a chain belt operating therein to elevate the paste into the path of the blanks on said advancing means.

In witness whereof I have hereunto set my hand this 16th day of May, 1901.

EDWIN G. STAUDE.

In presence of—
RICHARD PAUL,
M. C. NOONAN.